(12) United States Patent
Fan et al.

(10) Patent No.: US 8,287,708 B2
(45) Date of Patent: Oct. 16, 2012

(54) MICROFLUIDIC SYSTEM AND METHOD FOR CREATING AN ENCAPSULATED DROPLET WITH A REMOVABLE SHELL

(75) Inventors: Shih-Kang Fan, Hsinchu (TW);
Yao-Wen Hsu, Taipei County (TW);
Chiun-Hsun Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 200 days.

(21) Appl. No.: 12/815,580

(22) Filed: Jun. 15, 2010

(65) Prior Publication Data
US 2011/0147216 A1 Jun. 23, 2011

(30) Foreign Application Priority Data
Dec. 18, 2009 (TW) ................................ 98143595 A

(51) Int. Cl.
| | |
|---|---|
| B01D 57/02 | (2006.01) |
| B01D 59/42 | (2006.01) |
| B01D 59/50 | (2006.01) |
| C02F 1/469 | (2006.01) |
| C07K 1/26 | (2006.01) |
| C08F 2/58 | (2006.01) |
| C25B 7/00 | (2006.01) |
| C25B 15/00 | (2006.01) |
| G01F 1/64 | (2006.01) |
| G01L 1/20 | (2006.01) |
| G01L 9/18 | (2006.01) |

(52) U.S. Cl. ........ 204/450; 204/547; 204/600; 204/643; 436/180; 422/82

(58) Field of Classification Search .................. 422/100, 422/99, 82, 82.01, 82.02, 81; 436/149–150, 436/164, 180; 205/775; 204/450–470, 600–621, 204/641–645, 672, 546–550
See application file for complete search history.

(56) References Cited

U.S. PATENT DOCUMENTS

2006/0254933 A1* 11/2006 Adachi et al. ................. 205/777
2007/0243634 A1* 10/2007 Pamula et al. ................ 436/518
2009/0289213 A1* 11/2009 Pipper et al. ........... 252/62.51 R

* cited by examiner

Primary Examiner — Jeffrey T Barton
Assistant Examiner — Maris R Kessel
(74) Attorney, Agent, or Firm — Rosenberg, Klein & Lee

(57) ABSTRACT

A microfluidic system for creating encapsulated droplets whose shells can be further removed comprises: two electrode plates and a spacing structure disposed between the two electrode plates. One of the electrode plates has three reservoir electrodes and a plurality of channel electrodes. The three electrodes are respectively used for accommodating a shell liquid, a core liquid, and a removing liquid which is able to remove the shell liquid. The channel electrodes are used for communicating droplets among the three reservoir electrodes. Via these arrangements, the microfluidic system can create a quantitative shell droplet and a quantitative core droplet, and then merge the shell and core droplets to form an encapsulated droplet. Moreover, the shell of the encapsulated droplet can be removed by mixing it with the removing liquid. This invention is further provided with a method for creating an encapsulated droplet with a removable shell.

12 Claims, 9 Drawing Sheets

MICROFLUIDIC SYSTEM AND METHOD FOR CREATING AN ENCAPSULATED DROPLET WITH A REMOVABLE SHELL

BACKGROUND OF THE INVENTION

1. Field of the Invention

The present invention relates to an encapsulated droplet, in particular, to a microfluidic system and a method for creating an encapsulated droplet with a removable shell.

2. Description of Related Art

The microfluidic system, which is also called the microfluidic chip, now is widely studied and highly valued. It has many advantages, such as, high response rate, high sensitivity, high reproducibility, low cost, and low pollution, so as to be applied to biology, medicine, optoelectronics and other fields.

For the latest technology of the droplet-based microfluidic system, the volume of the driven droplet has been decreased to the level of sub-micro liter, or even to the level of pico liter. The rapid evaporation is consequently an issue to the shrunk droplets.

Then, possible solutions to this rapid-evaporation issue include enhancement of packaging and sealing of the microfluidic system or precise control of the environmental humidity and temperature. However, the straight forward solutions may increase the systems cost or limit the applicable situations and environments.

Therefore, some scholars have proposed the concept of encapsulated droplet by encapsulating the original ease-of-evaporating droplet with another immiscible droplet. For example, the original one is a water droplet; the immiscible one is an oil droplet. The oil droplet will wrap all around the water droplet in order to form an oil shell, preventing the water drop from evaporation. However, making the oil-shell with a controlled and reproducible volume by manually dispensing is difficult.

SUMMARY OF THE INVENTION

In view of the above-mentioned issues, a microfluidic system and a method for creating an encapsulated droplet with a removable shell are disclosed, in which volume of the encapsulated droplet is able to be precisely controlled, and the shell droplet of the encapsulated droplet is able to be removed if necessary.

To achieve the above-mentioned objectives, the present invention provides a microfluidic system for creating an encapsulated droplet with a removable shell, which includes a first electrode plate, a second electrode plate and a spacing structure. The first electrode plate has a first substrate and a first electrode layer. The first electrode layer is disposed on a surface of the first substrate. The first electrode layer has a first reservoir electrode, a second reservoir electrode, a third reservoir electrode, a plurality of first channel electrodes being sequent and adjacent to one another, and a plurality of second channel electrodes being sequent and adjacent to one another. A respective one of the first channel electrodes is adjacent to the first reservoir electrode, while another respective one of those is adjacent to the second reservoir electrode. A respective one of the second channel electrodes is adjacent to the third reservoir electrode, while another respective one of those is adjacent to the first channel electrodes. The first reservoir electrode accommodates a shell liquid, the second reservoir electrode accommodates a core liquid, and the third reservoir electrode accommodates a removing liquid that is able to remove the shell liquid. The second electrode plate has a second substrate and a second electrode layer. The second electrode layer is disposed on a surface of the second substrate and opposite to the first electrode layer. The spacing structure is disposed between the first and the second electrode plates to induce a space formed between the first and the second electrode plates.

To achieve the above-mentioned objectives, a method for creating an encapsulated droplet with a removable shell is provided. The method includes steps as follows: providing a microfluidic system having a first electrode layer and a second electrode layer opposite to each other; arranging a shell liquid onto a first reservoir electrode of the first electrode layer; arranging a core liquid onto a second reservoir electrode of the first electrode layer; arranging a removing liquid onto a third reservoir electrode of the first electrode layer; moving part of the shell liquid from the first reservoir electrode to one of channel electrodes of the first electrode layer by applying an electric potential across the first and the second electrode layers, so as to form a shell droplet; moving part of the core liquid from the second reservoir electrode to another one of the channel electrodes of the first electrode layer by applying an electric potential across the first and the second electrode layers, so as to form a core droplet; moving the shell droplet and the core droplet to contact each other by applying an electric potential across the first and the second electrode layers, the shell droplet wrapping around the core droplet to form an encapsulated droplet; moving the encapsulated droplet on the channel electrodes to approach the third reservoir electrode by applying an electric potential across the first and the second electrode layers; and removing the shell droplet of the encapsulated droplet by contacting the removing liquid and the encapsulated droplet.

The present invention further provides a microfluidic system for individually manipulating multiple liquids to create encapsulated droplets. The system includes a first electrode plate, a second electrode plate and a spacing structure. The first electrode plate has a first substrate and a first electrode layer. The first electrode layer is disposed on a surface of the first substrate. The first electrode layer has at least two reservoir electrodes (i.e., first reservoir electrode and second reservoir electrode), and a plurality of first channel electrodes being sequent and adjacent to one another. A respective one of the first channel electrodes is adjacent to one of the reservoir electrodes, while another respective one of those is adjacent to the other reservoir electrode. The first reservoir electrode accommodates a shell liquid, and the second reservoir electrode accommodates a core liquid. The second electrode plate has a second substrate and a second electrode layer. The second electrode layer is disposed on a surface of the second substrate and opposite to the first electrode layer. The spacing structure is disposed between the first and the second electrode plates to induce a space formed between the first and the second electrode plates.

It is worth mentioning that there are some advantages as follows:

1. Each volume of the shell droplet and the core droplet can be determined by the size of the first channel electrode and the distance between the first and second electrode plates, so that the volume thereof can be precisely calculated and experimentally obtained with high predictability and repeatability.

2. The shell droplet of the encapsulated droplet can be easily removed by merging it with the removing liquid.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
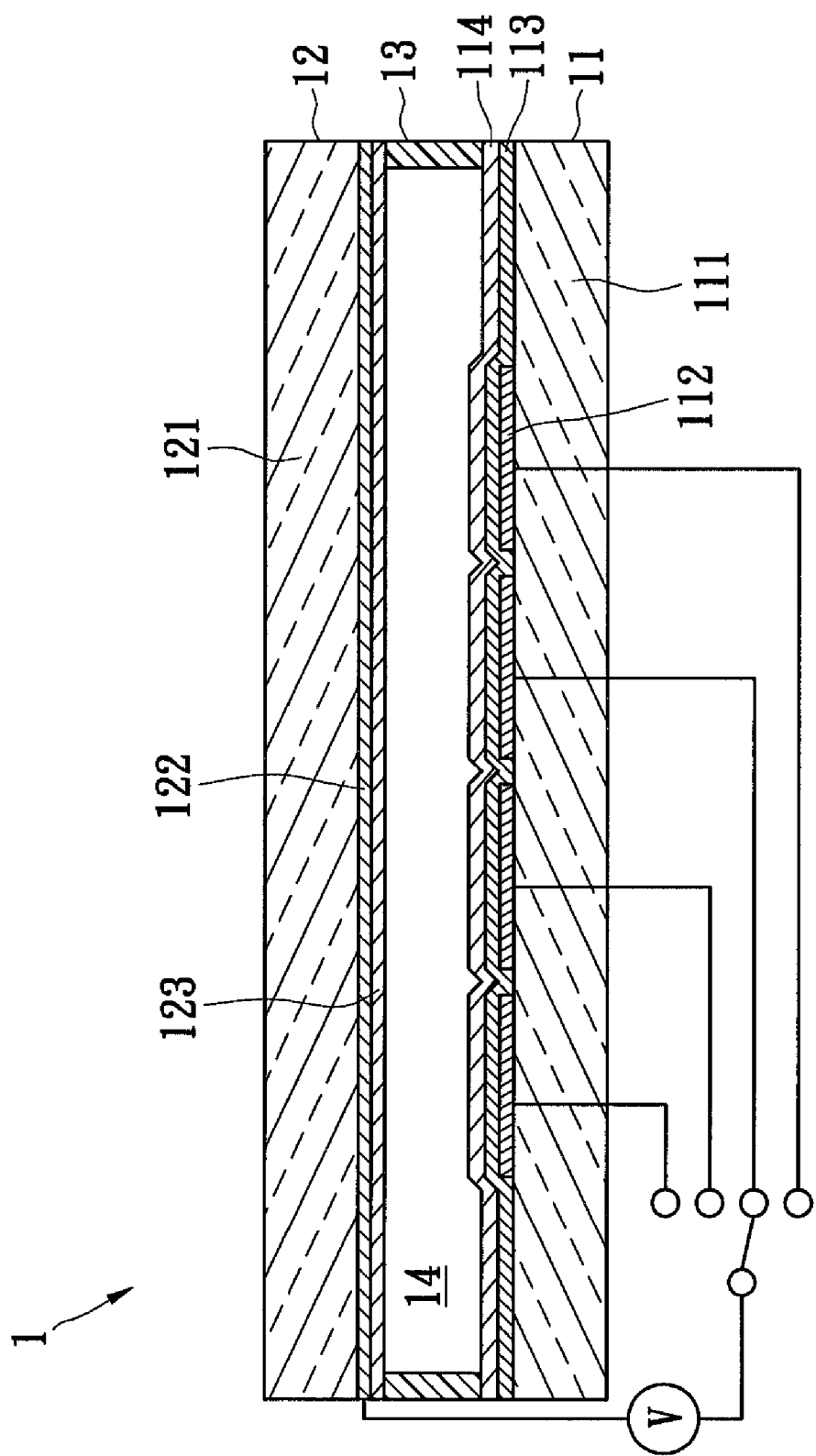
FIG. 1 is a cross-sectional view of a microfluidic system for creating an encapsulated droplet with a removable shell in accordance with a preferred embodiment of the present invention.
Figure 2:
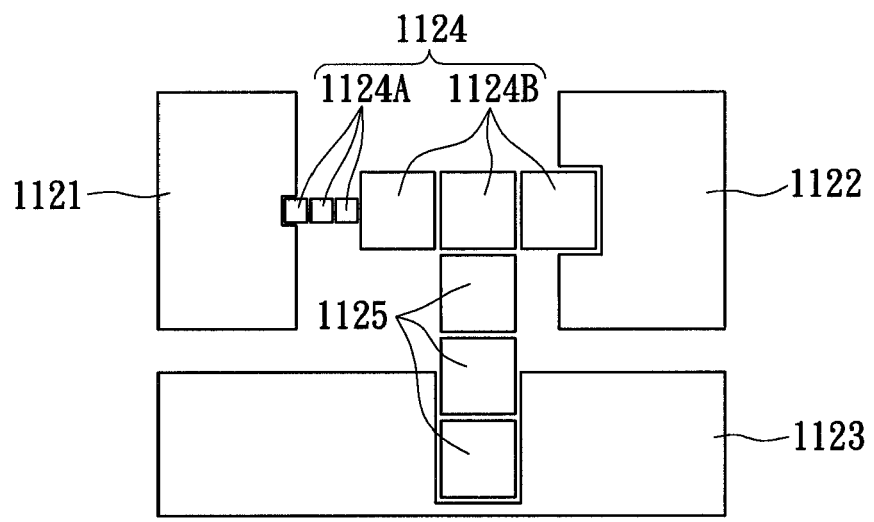
FIG. 2 is a top view of a first electrode layer of the microfluidic system in accordance with the preferred embodiment of the present invention.

Referring now to FIGS. 1 and 2, in which a microfluidic system for creating an encapsulated droplet with a removable shell in accordance with a preferred embodiment of the present invention is disclosed. For conciseness of illustration, the "microfluidic system for creating an encapsulated droplet with a removable shell" is called "microfluidic system" for short. The microfluidic system 1 includes a first electrode plate 11, a second electrode plate 12, and a spacing structure 13. After detailed descriptions for the technical feature of the microfluidic system 1, method for using the microfluidic system 1 will be introduced thereby.

The first electrode plate 11 includes a first substrate 111, a first electrode layer 112, a dielectric layer 113 and a first hydrophobic layer 114.

The first substrate 111 can be a rectangular substrate, which is made of glass materials, silicon materials, polydimethylsiloxane (PDMS), polyethylene terephthalate (PET), polyethylene naphthalate (PEN), flexible polymer materials or insulating materials. The glass materials would be better selections because the low surface roughness thereof may reduce the driving voltage of the microfluidic system 1.

The first electrode layer 112 is disposed on a surface, a top surface, of the first substrate 111. The first electrode layer 112 is made of conductive materials, conductive polymeric materials or conductive oxides, such as Cr, Cu metal, PEDOT: PSS (poly (3,4-ethylenedioxythiophene) polystyrenesulfonate) or Indium Tin Oxide (ITO). The first electrode layer 112 includes a plurality of electrodes 1121 to 1125, which are sequent and adjacent to one another. According to their functional or dimensional requirements, the electrodes 1121 to 1125 can be divided into a first reservoir electrode 1121, a second reservoir electrode 1122, a third reservoir electrode 1123, a plurality of first channel electrodes 1124, and a plurality of second channel electrodes 1125.

The first reservoir electrode 1121 is used for reserving a shell liquid 2 (shown in FIG. 8). The second reservoir electrode 1122 is used for reserving a core liquid 3, which is immiscible to the shell liquid 2 (shown in FIG. 8). The third reservoir electrode 1123 is used for reserving a removing liquid 4, which is able to dissolve the shell liquid 2 but unable to or hard to mix with the core liquid 3 (shown in FIG. 8). The first and second channel electrodes 1124 and 1125 are used for communicating the droplets among the three reservoir electrodes 1121 to 1123.

The first channel electrodes 1124 could be adjacent to one another in a sequential order, i.e. there would be a gap among them, and be arranged in a horizontal line. Likely, the second channel electrodes 1125 also are adjacent to one another in a sequential order, and arranged in a vertical line. A respective one of the first channel electrodes 1124, the extreme left one, is adjacent to the first reservoir electrode 1121. Another respective one of the first channel electrodes 1124, the extreme right one, is adjacent to the second reservoir electrode 1122. A respective one of the second channel electrodes 1125, the extreme bottom one, is adjacent to the third reservoir electrode 1123. Another respective one of the second channel electrodes 1125, the extreme top one, is adjacent to another respective one of the first channel electrodes 1124, the one next to the extreme right one.

Figure 3:
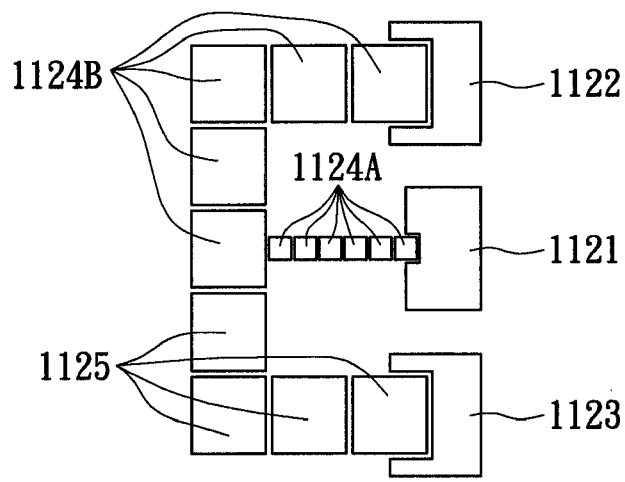
FIG. 3 is a top view of a first electrode layer of a microfluidic system in accordance with another embodiment of the present invention.
Figure 4:
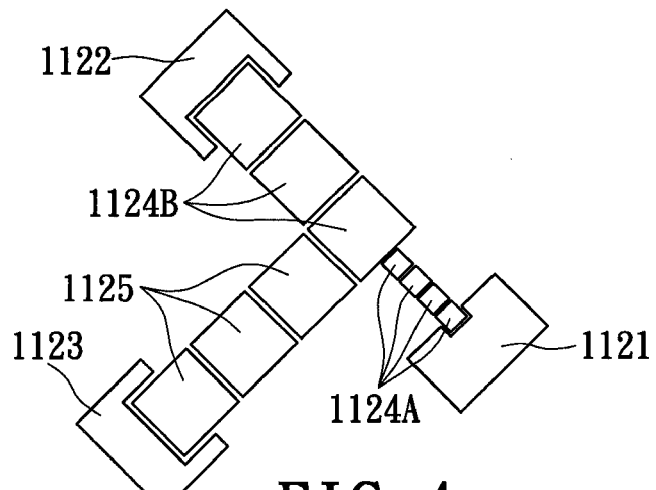
FIG. 4 is a top view of a first electrode layer of a microfluidic system in accordance with an additional embodiment of the present invention.

In accordance with the top view of the channel electrodes, the first channel electrodes 1124 and the second channel electrodes 1125 are arranged in a form of letter "T". With respect to FIGS. 3 and 4, the first channel electrodes 1124 and the second channel electrodes 1125 could also be arranged in forms of letters "E" and "λ".

With respect to FIG. 2, the top view of each electrode 1121-1125 could be rectangular. Moreover, the dimensions of the first, the second and the third reservoir electrodes 1121-1123 are larger than the dimensions of the first and the second channel electrodes 1124 and 1125. The respective three of the first channel electrodes 1124, which are close to the first reservoir electrode 1121, are denoted as 1124A. Another respective three of the first channel electrodes 1124, which are close to the second reservoir electrode 1122, are denoted as 1124B. The dimension of each first channel electrode 1124A could be designed to differ from that of each first channel electrode 1124B. For example, the dimension of each first channel electrode 1124A is smaller than that of each first channel electrode 1124B, so as to change the ratio of shell droplet to core droplet of the encapsulated droplet mentioned below.

Here are descriptions of other components of the microfluidic system 1. The dielectric layer 113 is disposed on the first electrode layer 112 to cover the electrodes 1121-1125. The dielectric layer 113 could be made of Parylene, positive photoresist materials, negative photoresist materials, high dielectric constant materials, and low dielectric constant materials.

The first hydrophobic layer 114 is disposed on the top of the dielectric layer 113 to cover all over the dielectric layer 113. The first hydrophobic layer 114 is made of hydrophobic materials, such as Teflon, Cytop, and fluoropolymers; and its purpose is to ease the driving of the shell droplet 21 and core droplet 31, (shown in FIG. 5), mentioned below. The first hydrophobic layer 114 is also called a low friction layer, because of low coefficient of friction between the fluid and itself, so that the fluid can easily flow over the first hydrophobic layer 114.

The above description is for the first electrode plate 11, and here is description for the second electrode plate 12. The second electrode plate 12 is disposed over and parallel to the first electrode plate 11. The second electrode plate 12 has a second substrate 121, a second electrode layer 122 and a second hydrophobic layer 123.

Similarly, the second substrate 121 is a rectangular substrate, which could be also made of glass materials, silicon materials, PDMS, PET, PEN, flexible polymer materials or isolating materials. The glass materials could be better selections due to the low surface roughness thereof, which may reduce the driving voltage of the microfluidic system 1.

The second electrode layer 122 is disposed on a surface, a bottom surface, of the second substrate 121, and is opposite to the first electrode layer 112. The second electrode layer 122 is made of conductive materials, conductive polymeric materials or conductive oxides, such as Cr, Cu, PEDOT: PSS, metal or ITO.

The second hydrophobic layer 123 is disposed on the bottom of the second electrode layer 122 to cover all over the second electrode layer 122. The second hydrophobic layer 123, similar to the first hydrophobic layer 114, is made of hydrophobic materials, such as Teflon, Cytop, and fluoropolymers, for easing the driving of the shell droplet 21 and core droplet 31 (shown in FIG. 5, mentioned below). The second hydrophobic layer 123 could be also called a low friction layer.

The above description is for the second electrode plate 12, and here is description for the spacing structure 13. The spacing structure 13 is disposed between the first and the second electrode plates 11, 12 to induce a space 14 formed between the first and the second electrode plates for accommodating liquid. The spacing structure 13 may be a continuous frame structure or several separated pillar structures.

The fluid in the microfluidic system 1 is controlled through physical phenomena, such as Dielectrophoresis (DEP), Electrowetting-on-dielectric (EWOD), in accordance with the properties of the liquid, such as dielectric fluid or conductive fluid. Usually, dielectric fluid is non-polar liquids; the conductive fluid is polar liquids. If the liquid is a dielectric fluid, it may be driven by the phenomenon of DEP. If the liquid is a conductive fluid, the liquid may be driven by the phenomenon of EWOD or DEP.

With respect to FIGS. 5 and 6, more details regarding how the microfluidic system 1 controls the fluid or droplet and creates the encapsulated droplet are described below. A shell droplet 21 and a core droplet 31 are taken as an example.

The shell droplet 21 is a dielectric fluid, such as an oil droplet, arranged in the space 14 and on a respective one of the first channel electrodes 1124A. The core droplet 31 is a conductive fluid, such as a water droplet, arranged in the space 14 and on a respective one of the first channel electrodes 1124B. The shell droplet 21 and the core droplet 31 are individually surrounded by environmental fluid, such as air.

Figure 5:
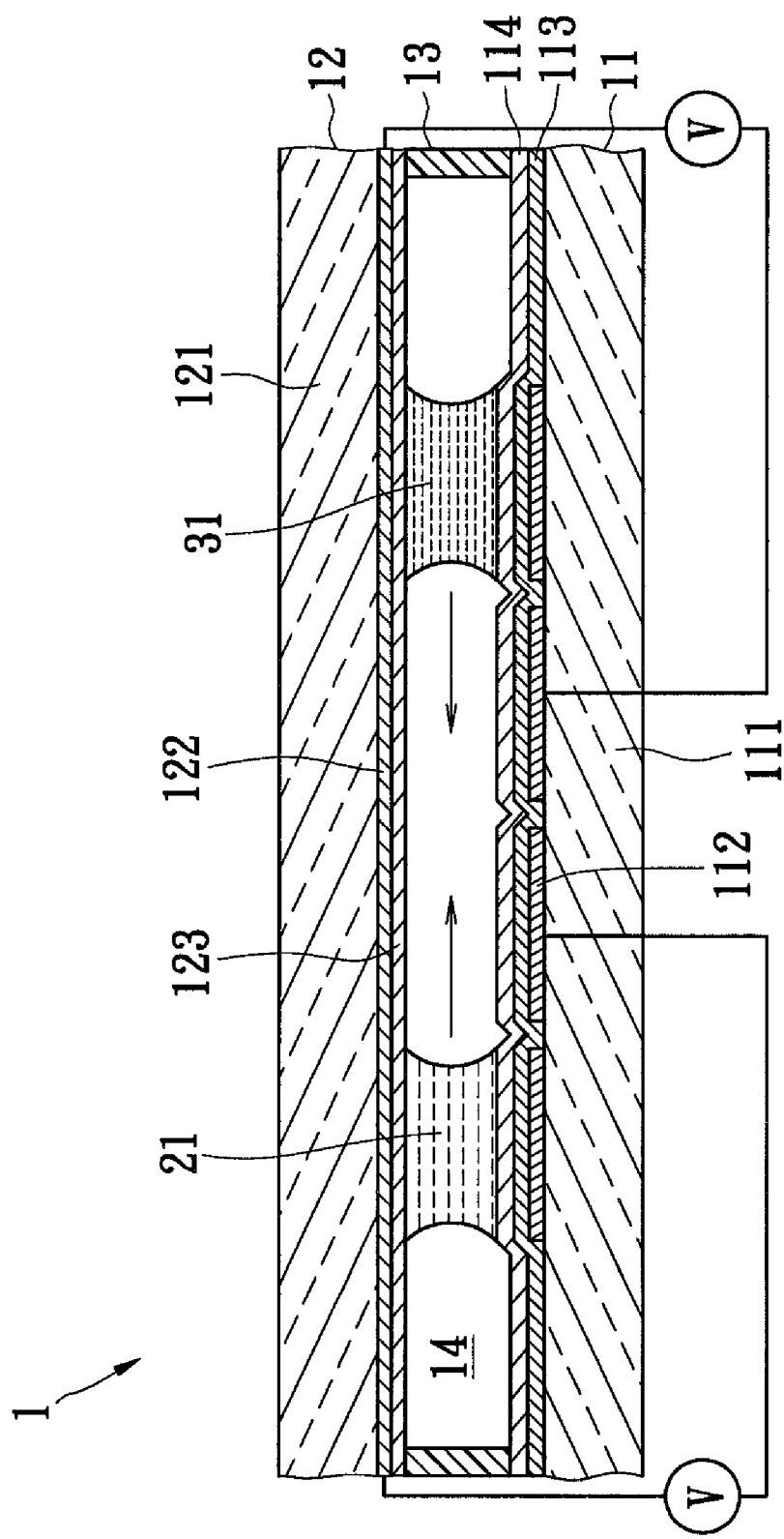
FIG. 5 is a schematic view illustrating droplets controlled by the microfluidic system in accordance with the preferred embodiment of the present invention.

With respect to FIG. 5, a direct current (DC) is applied between the second electrode layer 122 and a respective one of the first channel electrodes 1124A, which is just at the right hand side of the shell droplet 21. Due to the difference of the dielectric constant between the shell droplet 21 and the air, different electric forces on the interface will generate a pressure difference, which leads the shell droplet 21 to move toward the right hand side. The phenomenon is called DEP. An alternating current (AC) is applied between the second electrode layer 122 and a respective one of the first channel electrodes 1124B, which is just at the left hand side of the core droplet 31. Due to the decrease of the contact angle between the core droplet 31 and the dielectric layer and/or hydrophobic layer, a pressure difference is generated so as to lead the core droplet 31 to move forward the left-hand side, where the liquid pressure is smaller. The phenomenon is called EWOD.

Figure 6:
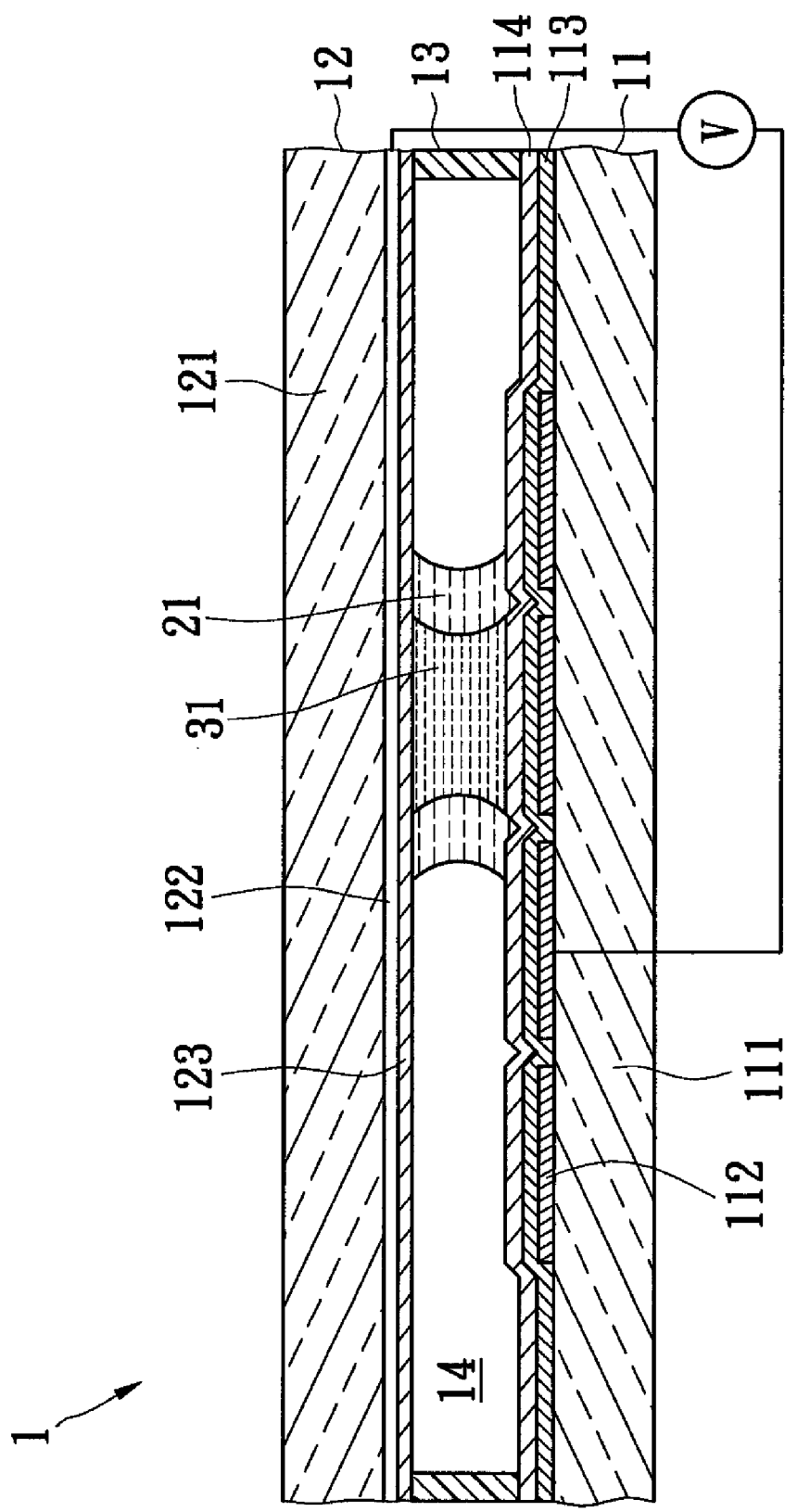
FIG. 6 is another schematic view illustrating an encapsulated droplet controlled by the microfluidic system in accordance with the preferred embodiment of the present invention.

FIG. 6 illustrates the encapsulated droplet, which is formed by the core droplet 31 wrapped in the shell droplet 21 spontaneously due to different surface tensions when they contact. Because the encapsulated droplet possesses dielectric and conductive fluids, DEP and EWOD would be chosen for the movement of the encapsulated droplet. The EWOD phenomenon is selected to implement in the preferred embodiment. Moreover, the core droplet 31 in FIG. 5 can also be driven through the DEP phenomenon, which is usually induced by a DC signal. However, the DEP phenomenon can also be induced by an AC signal.

Figure 7:
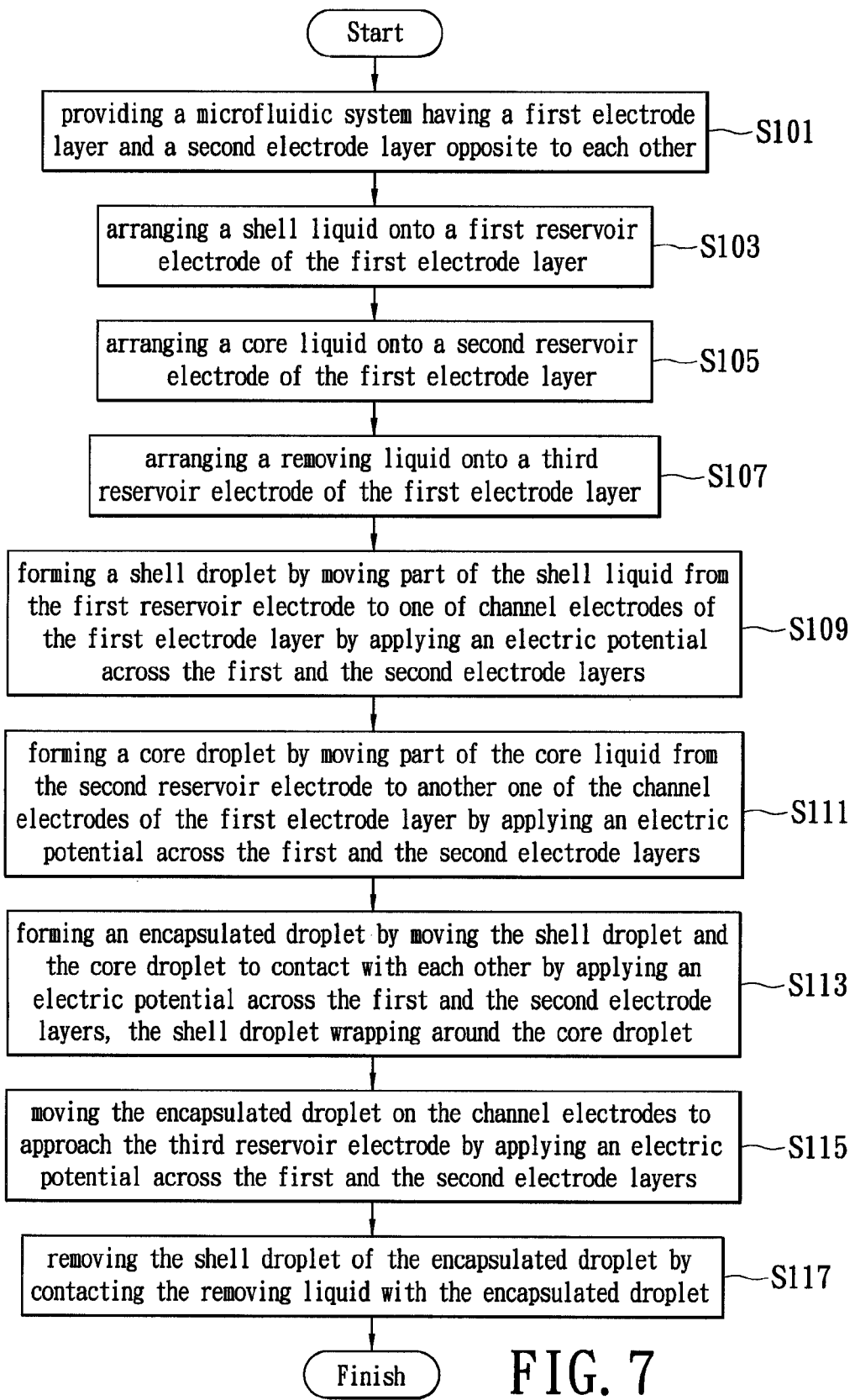
FIG. 7 is a flowchart of a method for creating an encapsulated droplet with a removable shell in accordance with a preferred embodiment of the present invention.

Referring to FIGS. 7 and 8, a method for creating an encapsulated droplet with a removable shell according to a preferred embodiment of the present invention is described below, which is performed by the microfluidic system 1 mentioned above.

Referred in step S101: a microfluidic system 1 is provided, and a shell liquid 2, a core liquid 3 and a removing liquid 4 are selected to use in the microfluidic system 1. The shell liquid 2 and the core liquid 3 may be respectively dielectric fluid and conductive fluid depending on the specific function that the microfluidic system 1 meets. In this embodiment, the dielectric fluid, such as silicone oil, which is beneficial to the biomedical field very well, is selected as the shell liquid 2; the conductive fluid, such as water, is selected as the core liquid 3; and the volatile solvent, such as Hexane, which can mix with and dissolve the silicone oil very well, is selected as the removing liquid.

Figure 8A:
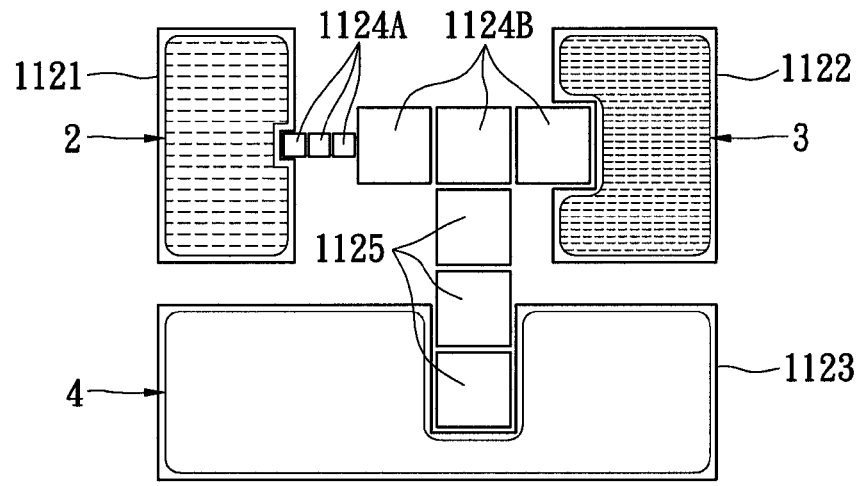
FIGS. 8A to 8F are schematic views illustrating sequential steps of the method in accordance with the preferred embodiment of the present invention.

Referred in steps S103 to S107: shown in FIG. 8A, the shell liquid 2 is arranged in the space 14 and on the first reservoir electrode 1121, the core liquid 3 is arranged in the space 14 and on the second reservoir electrode 1122, and the removing liquid 4 is arranged in the space 14 and on the third reservoir electrode 1123. Proper electric potentials are applied to the first, second and the third reservoir electrodes 1121, 1122 and 1123 to hold liquid 2, 3, and 4 thereon respectively.

Figure 8B:
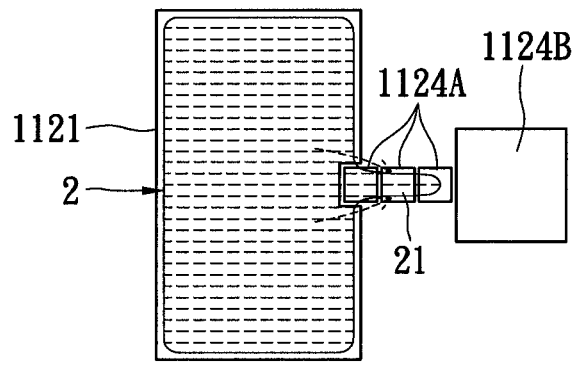

Referred in step S109: shown in FIG. 8B, the electric potential is applied to the second electrode layer 122 and a respective one of the first channel electrodes 1124A, which is closest to the first reservoir electrode 1121. Part of the shell liquid 2 can be moved by DEP to the one of the first channel electrodes 1124A, to which electric potential is applied, so as to form a shell droplet 21.

Figure 8C:
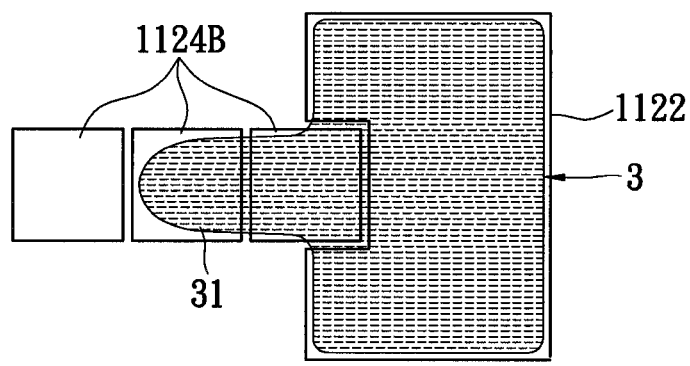

Referred in step S111: shown in FIG. 8C, the electric potential is applied to the second electrode layer 122 and a respective one of the first channel electrodes 1124B, which is closest to the second reservoir electrode 1122. Part of the core liquid 3, can be moved by EWOD to the one of the first channel electrodes 1124B, to which electric potential is applied, so as to form a core droplet 31.

Figure 8D:
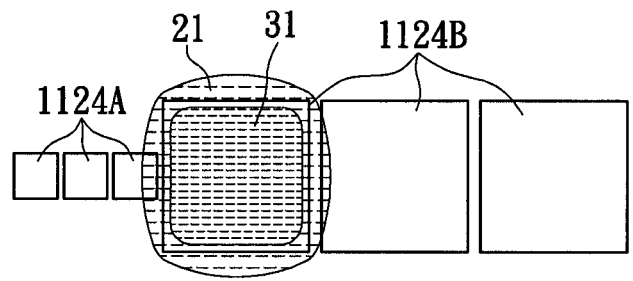

Referred in step S113: shown in FIGS. 8D and 5, the electric potential is applied to the first channel electrodes 1124A and the second electrode layer 122; and the electric potential is applied to the first channel electrodes 1124B and the second electrode layer 122. Therefore, the shell droplet 31 and the core droplet 21 move respectively on the first channel electrodes 1124A and 1124B so as to contact or merge with each other. The shell droplet 21 wraps around the core droplet 31 to form an encapsulated droplet.

Figure 8E:
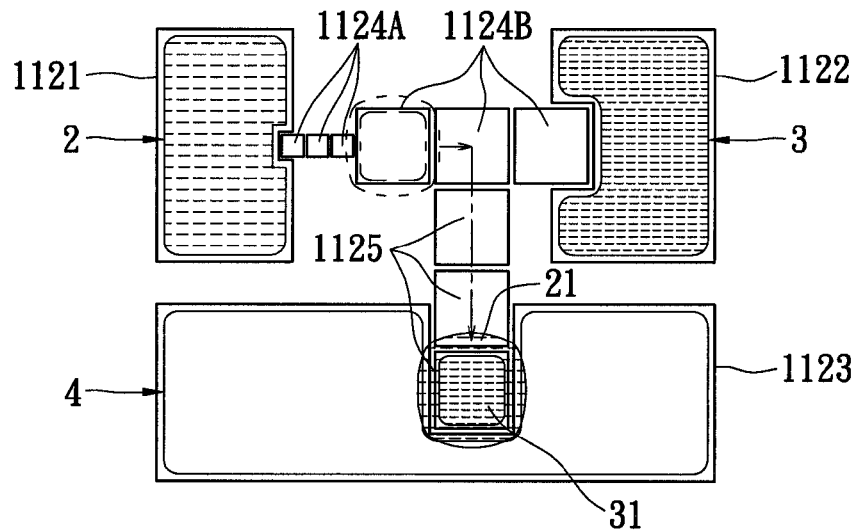

Referred in step S115: shown in FIG. 8E, the electric potential is applied to the second channel electrodes 1125 and the second electrode layer 122, so as to move the encapsulated droplet on the second channel electrodes 1125 until it approaches the third reservoir electrode 1123.

Figure 8F:
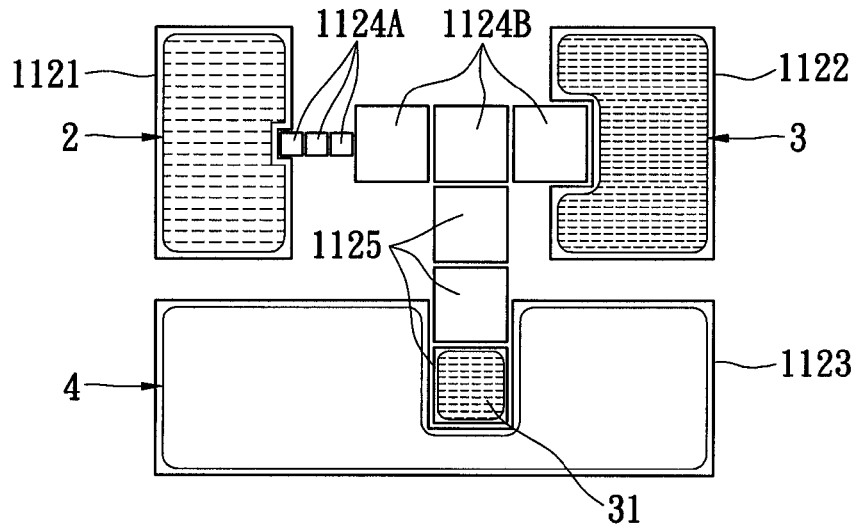

Referred in step S117: shown in FIG. 8F, the removing liquid 4 on the third reservoir electrode 1123 contacts the shell droplet 21 of the encapsulated droplet. The removing liquid 4 mixes with the shell liquid 21, and dissolves the shell liquid 21, so that the encapsulated droplet is returned to the core droplet 31. Then, the electric potential is applied to the second channel electrodes 1125 and the second electrode layer 122 again, making the core droplet 31 leave the third reservoir electrode 1123 to one of the second channel electrodes 1125. A part of the removing liquid 4 is also moved to the second channel electrode 1125 with core droplet 31, and wraps around the core droplet 31. However, the removing liquid 4 evaporates in a short period of time, leaving the core droplet 31 alone on the second channel electrode 1125.

The procedures of steps S101 to S117 can be adjusted. For example, the step S107 can be set following the step S115, and the step S109 can be set following the step S111. The result of the adjusted steps is as same as the previous one.

Moreover, after the step S113, a second shell droplet (not shown) can be further formed, to be immiscible with the shell droplet 21. The second shell droplet contacts the encapsulated droplet to create a second shell thereon. To repeat this step, the encapsulated droplet could have multiple shells thereon.

By the method of creating the encapsulated droplet, the volume of shell droplet 21 or the core droplet 31 can be calculated precisely. The volume is obtained in response to the dimension of each first channel electrode 1124A, 1124B and the distance between the first and the second electrode plates 11 and 12. When the dimension of each first channel electrode 1124A and 1124B is larger, the volume of the shell droplet 21 and the core droplet 31 become greater.

Figure 9:
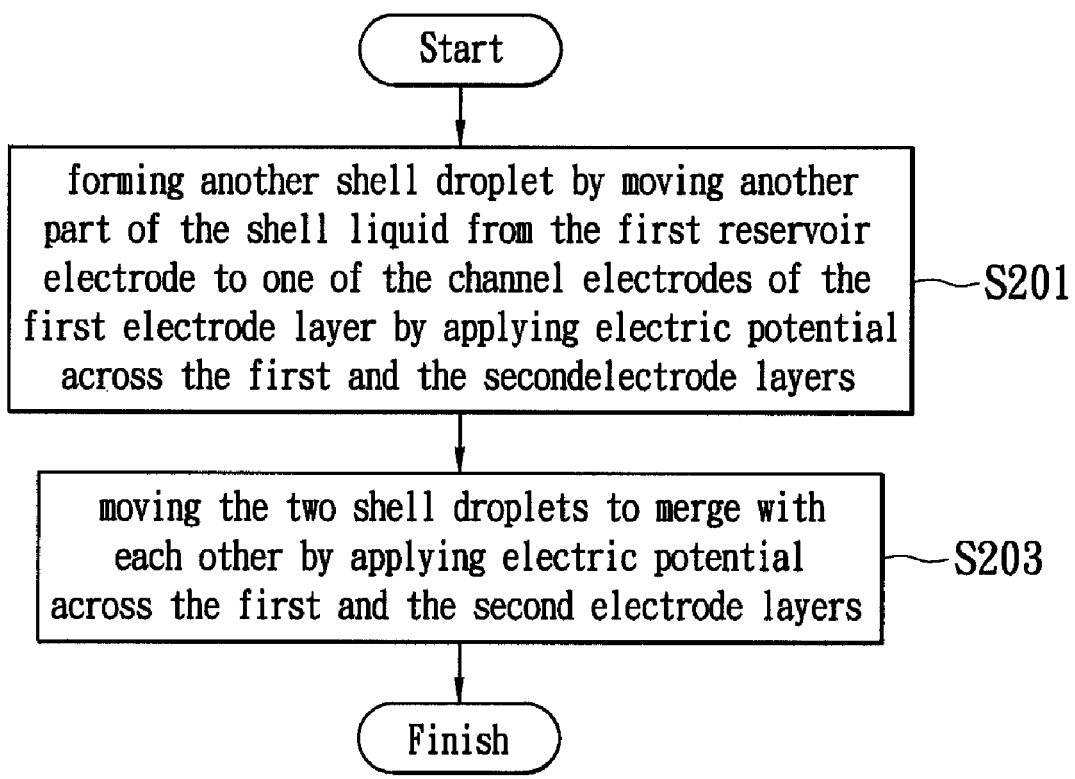
FIG. 9 is a flowchart of a method in accordance with another embodiment of the present invention.

In addition to increasing the dimension of the first channel electrodes 1124A and 1124B, the volume of the shell droplet 21 and the core droplet 31 could be increased further by the steps mentioned below. With respect to FIGS. 9 and 10, the shell droplet 21 is taken as an example.

Figure 10A:
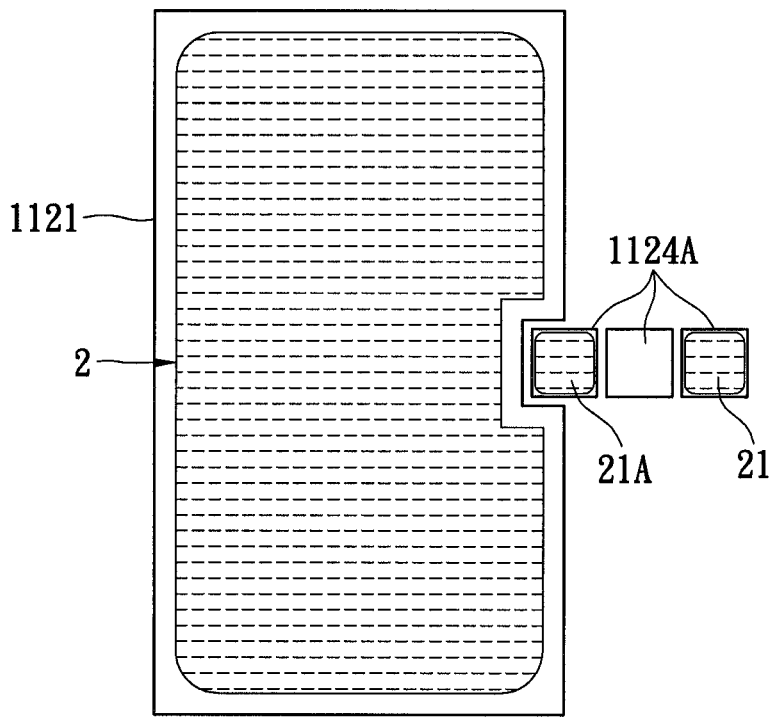
FIGS. 10A and 10B are schematic views illustrating sequential steps of the method in accordance with the other embodiment of the present invention.

Referred in step S201: with respect to FIG. 10A, the shell droplet 21 has been formed on a respective one of the first channel electrodes 1124A, which is remote from the first reservoir electrode 1121. Then electric potential is applied to the second electrode layer 122 and another respective one of the first channel electrodes 1124A, which is close to the first reservoir electrode 1121. Another partial part of the shell liquid 2 can move to the first channel electrode 1124A, to which the electric potential is applied, so as to form another shell droplet 21A.

Figure 10B:
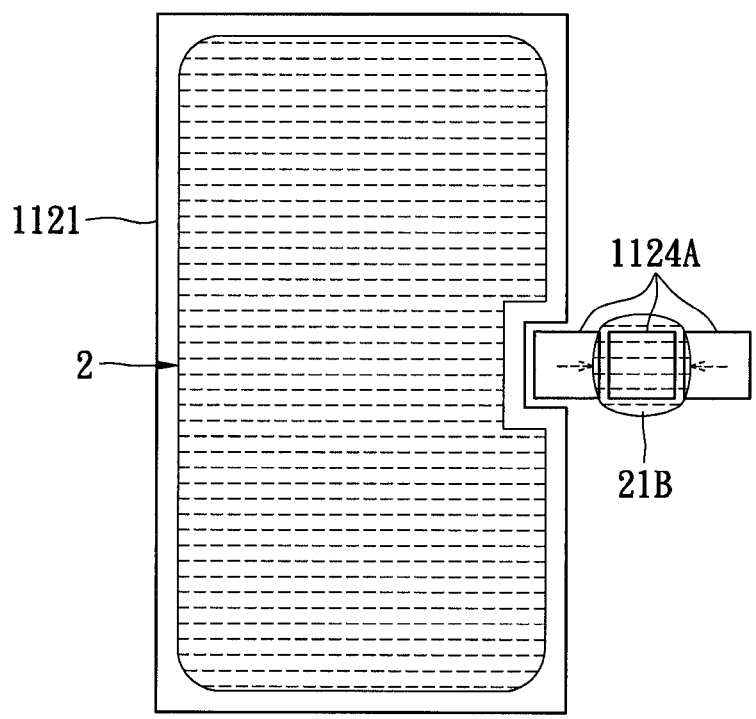

Referred in step S203: with respect with FIG. 10B, the electric potential is applied to the first channel electrodes 1124A and the second electrode layer 122. Then the two shell droplets 21 and 21A move on the first channel electrode 1124A to contact each other. The two shell droplets 21, 21A merge with each other to create a larger shell droplet 21B.

After the step S203, the step S113 may be performed to form the encapsulated droplet having a larger quantitative shell droplet 21B. Moreover, it is noteworthy that the steps S201 and S203 can be repeated more than once, so as to further increase the volume of shell droplet 21B.

Here are descriptions for real applications of the microfluidic system 1, such as extraction, purification, protein crystallization, and artificial cell membrane formation. Take extraction for instance, while the user injects the blood sample into the shell liquid 2, the core liquid 3 attracts a specific molecule of the blood sample. When the shell droplet 21 containing the specific molecule of the blood sample contacts the core droplet 31 to create an encapsulated droplet, the specific molecule of the blood sample will move into the core droplet 31. After the shell droplet 21 is removed by the removing liquid 4, the core droplet 31 only includes one specific molecule of the blood sample, so as to achieve the extraction. In addition, the volume of the shell droplet 21 and the core droplet 31 could be calculated, so that the concentration of the extracted molecule is calculated thereby.

Take purification for instance, while the user injects the blood sample into the core liquid 3, the shell liquid 2 attracts a specific molecule of the blood sample. When the core droplet 31 containing the specific molecule of the blood sample contacts the shell droplet 21 to create an encapsulated droplet, the specific molecule of the blood sample will be moved into the shell droplet 21. After the shell droplet 21 is removed by the removing liquid 4, the core droplet 31 would not include the specific molecule of the blood sample, so as to achieve the purification.

Take protein crystallization for instance, while the user injects the protein molecules into the core liquid 3, the core droplet 31 merges with the shell droplet 21 to create an encapsulated droplet including the protein molecules. Because the vaporization velocity of core droplet 31 could be controlled in the encapsulated droplet, which is adjusted by the types and volume of the shell droplet 21, the protein crystal growth and nucleation would be controlled in accordance with the vaporization velocity. Therefore, the protein molecules arrange in order slowly for crystallization.

Take artificial cell membrane formation for instance, while the user injects lipid molecules into the core liquid 3 or the shell liquid 2, the core droplet 31 merges with the shell droplet 21 to create an encapsulated droplet with a monolayer of lipid molecules self-assembled at the core-shell liquid interface. When contact two or more encapsulated droplets, artificial cell membrane(s) can be formed between two encapsulated droplets.

Other embodiments of the microfluidic system 1 are detailed below. If the shell liquid 2 or the core liquid 3 possesses sufficient hydrophobic property or surface energy, or the dielectric layer 113 and the second electrode layer 122 are hydrophobic to the shell liquid 21 or the core liquid 3, the first hydrophobic layer 114 and the second hydrophobic 123 are not necessary to be set.

Moreover, if the shell liquid 21 and the core liquid 31 are both controlled through the DEP phenomenon, and the dielectric property of the shell liquid 2 and the core liquid 3 has met usage requirements, the dielectric layer 113 are not necessary to be set.

Moreover, the second electrode layer 122 may include individual sequential electrodes, and the dimension and arrangement of each electrode would correspond to the electrodes 1221 to 1125 of the first electrode layer 112.

Furthermore, the shell liquid 2 and the core liquid 3 could be the conductive fluid or polar liquid. For example, the shell liquid 2 can be high-carbon aliphatic alcohol, such as octanol or decanol alcohol, while the core liquid 2 is water.

In conclusion, it is worth mentioning that there are some advantages as follows:

1. Each volume of the shell droplet 21 and the core droplet 31 is determined in response to the size of the first channel electrode 1124 and the distance between the first and second electrode plates 11, 12, so that the volume thereof can be calculated precisely and obtained with high predictability and repeatability.

2. The shell droplet 21 of the encapsulated droplet can be easily removed by merging with the removing liquid 4.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method for creating an encapsulated droplet with a removable shell, comprising:
   providing a microfluidic system having a first electrode layer and a second electrode layer opposite to each other;
   arranging a shell liquid onto a first reservoir electrode of the first electrode layer;
   arranging a core liquid onto a second reservoir electrode of the first electrode layer;
   arranging a removing liquid onto a third reservoir electrode of the first electrode layer;
   forming a shell droplet by moving part of the shell liquid from the first reservoir electrode to one of channel electrodes of the first electrode layer by applying an electric potential across the first and the second electrode layers;
   forming a core droplet by moving part of the core liquid from the second reservoir electrode to another one of the channel electrodes of the first electrode layer by applying an electric potential across the first and the second electrode layers;
   forming an encapsulated droplet by moving the shell droplet and the core droplet to contact each other by applying an electric potential across the first and the second electrode layers, the shell droplet wrapping around the core droplet;
   moving the encapsulated droplet on the channel electrodes to approach the third reservoir electrode by applying an electric potential across the first and the second electrode layers; and
   removing the shell droplet of the encapsulated droplet by contacting the removing liquid with the encapsulated droplet;
   wherein the removing liquid mixes with the shell droplet, and then dissolves the shell droplet from the encapsulated droplet, so that the encapsulated droplet is returned to the core droplet.

2. The method according to claim 1, further comprises:
   moving the core droplet from the third reservoir electrode to one of the channel electrodes of the first electrode layer by applying an electric potential across the first and the second electrode layers.

3. The method according to claim 1, further comprises:
   forming another shell droplet by moving another part of the shell liquid from the first reservoir electrode to one of the channel electrodes of the first electrode layer by applying an electric potential across the first and the second electrode layers; and
   moving the two shell droplets to merge with each other by applying an electric potential across the first and the second electrode layers.

4. The method according to claim 1, wherein when the shell liquid or the core liquid is a conductive fluid, the shell liquid or the core liquid is moved through a physical phenomenon of electrowetting-on-dielectric.

5. The method according to claim 1, wherein when the shell liquid or the core liquid is a conductive fluid, the shell liquid or the core liquid is moved through a physical phenomenon of dielectrophoresis.

6. The method according to claim 1, wherein when the shell liquid or the core liquid is a dielectric fluid, the shell liquid or the core liquid is moved through a physical phenomenon of dielectrophoresis.

7. A method for creating an encapsulated droplet with a removable shell, comprising:
   providing a microfluidic system having a first electrode layer and a second electrode layer opposite to each other;
   arranging a shell liquid onto a first reservoir electrode of the first electrode layer;
   arranging a core liquid onto a second reservoir electrode of the first electrode layer;
   arranging a removing liquid onto a third reservoir electrode of the first electrode layer;
   forming a shell droplet by moving part of the shell liquid from the first reservoir electrode to one of channel electrodes of the first electrode layer by applying an electric potential across the first and the second electrode layers;
   forming a core droplet by moving part of the core liquid from the second reservoir electrode to another one of the channel electrodes of the first electrode layer by applying an electric potential across the first and the second electrode layers;
   forming an encapsulated droplet by moving the shell droplet and the core droplet to contact each other by applying an electric potential across the first and the second electrode layers, the shell droplet wrapping around the core droplet;
   moving the encapsulated droplet on the channel electrodes to approach the third reservoir electrode by applying an electric potential across the first and the second electrode layers; and
   removing the shell droplet of the encapsulated droplet by contacting the removing liquid with the encapsulated droplet, so that the encapsulated droplet is returned to the core droplet.

8. The method according to claim 7, further comprises:
   moving the core droplet from the third reservoir electrode to one of the channel electrodes of the first electrode layer by applying an electric potential across the first and the second electrode layers.

9. The method according to claim 7, further comprises:
   forming another shell droplet by moving another part of the shell liquid from the first reservoir electrode to one of the channel electrodes of the first electrode layer by applying an electric potential across the first and the second electrode layers; and
   moving the two shell droplets to merge with each other by applying an electric potential across the first and the second electrode layers.

10. The method according to claim 7, wherein when the shell liquid or the core liquid is a conductive fluid, the shell liquid or the core liquid is moved through a physical phenomenon of electrowetting-on-dielectric.

11. The method according to claim 7, wherein when the shell liquid or the core liquid is a conductive fluid, the shell liquid or the core liquid is moved through a physical phenomenon of dielectrophoresis.

12. The method according to claim 7, wherein when the shell liquid or the core liquid is a dielectric fluid, the shell liquid or the core liquid is moved through a physical phenomenon of dielectrophoresis.

* * * * *